(Model.)

H. B. COBB.
SKATE ROLLER.

No. 357,579. Patented Feb. 15, 1887.

Witnesses:
Chas. E. Gaylord,
W. S. Bates

Inventor:
Henry B. Cobb,
By Dyrenforth & Dyrenforth,
Att'ys.

UNITED STATES PATENT OFFICE.

HENRY B. COBB, OF WILMINGTON, DELAWARE.

SKATE-ROLLER.

SPECIFICATION forming part of Letters Patent No. 357,579, dated February 15, 1887.

Application filed May 29, 1886. Serial No. 203,630. (Model.)

*To all whom it may concern:*

Be it known that I, HENRY B. COBB, a citizen of the United States, residing at Wilmington, in the county of New Castle and State of Delaware, have invented a certain new and Improved Skate-Roller; and I hereby declare the following to be a full, clear, and exact description of the same.

The essential requirements in the rollers for roller-skates are lightness, durability, and means for permitting lubrication.

It is my object to provide a skate-roller which shall possess in a high degree the qualities of lightness and durability and afford automatic lubrication to the parts.

To these ends my invention consists in the construction of the tire portion, whereby it is provided with annular recesses forming lateral shoulders.

My invention also consists in the general construction of the roller; and it further consists in certain details of construction and combinations of parts, all as hereinafter more fully set forth and claimed.

Figure 1:
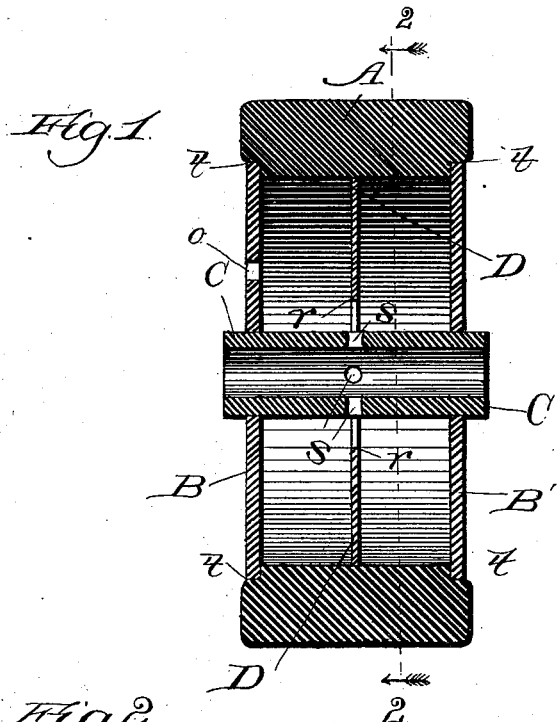
Figure 2:
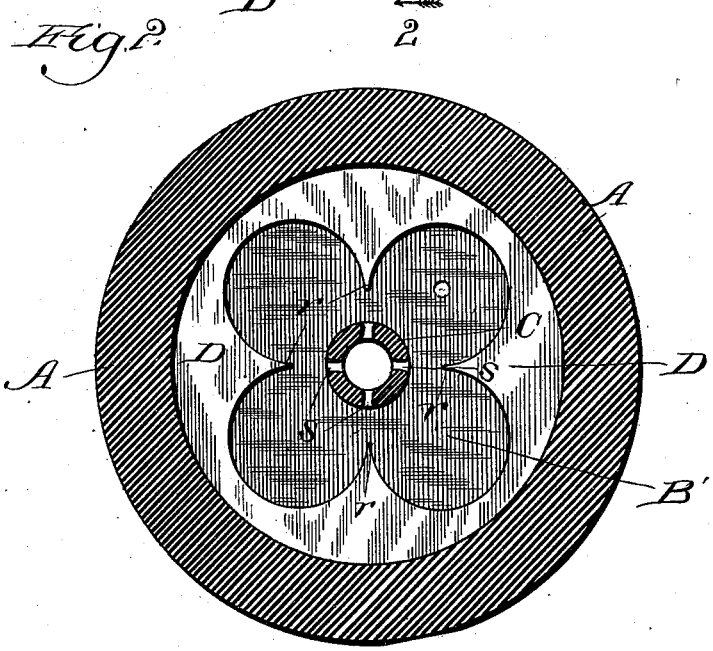

Referring to the drawings, Figure 1 is a central transverse section through a skate-roller of my improved construction; and Fig. 2, a sectional view of the same, taken on the line 2 2 of Fig. 1.

A is a tire, formed of vulcanized fiber or other suitable hard material, including vulcanized rubber, and provided toward its edges, on the inner side of the annulus forming the tire, with recesses, forming shoulders $t$. When vulcanized rubber is used, the recesses $t$ may be formed in the casting of the tire, which affords an advantage over vulcanized fiber, with which the cheapest way of forming the recesses is by turning them upon each tire in a lathe.

B and B' are thin disks, preferably of metal, and having each an opening at its center. These disks fit snugly against the shoulders $t$ in the tire and support and strengthen the latter to such a degree that the hollow roller thus formed, while much lighter than if solid, is practically as strong as a solid one.

A sleeve, C, passes through the openings in the disks B and B' and holds them securely together and against possible displacement. The sleeve C also receives and affords a bearing for the shaft or axle, (not shown,) and is provided with a hole, $s$, or with several such holes, as shown, to permit through each access to the axle of the lubricating-oil, which is fed automatically in the manner hereinafter described.

Between the lateral strengthening-disks B and B', and preferably in a central position between them, is a tight-fitting metal disk, D, stamped out around its center to produce the form shown in Fig. 2 of the drawings, and provide guiding projections $r$, all of which tend to a central point and serve to guide lubricating-oil into the openings $s$, with which they may or may not be quite coincident. The hollow roller thus formed affords an oil-reservoir, into which a small quantity of lubricating-oil is poured through a suitable opening, $o$, in one of the sides, and the rotation of the roller causes the oil, which remains at rest in the lower part of the roller during such rotation, to trickle down the guides $r$ and drop into a coincident opening, $s$, in the sleeve, or upon the sleeve adjacent to an opening $s$ therein, and thence enter the same and lubricate the axle.

A sufficient quantity of oil may be contained within the roller to avoid the necessity of more than occasional replenishing, and the lubrication is thus automatic and effectual without being too copious; but of course the roller should at no time contain sufficient oil to permit leakage, which would occur if the supply extended too high therein.

What I claim as new, and desire to secure by Letters Patent, is—

1. A skate-roller comprising, in combination, a tire, A, thin disks B and B', inserted into annular recesses in the opposite inner sides of the tire to support and strengthen the same, and a perforated sleeve, C, securing the disks together in position, substantially as and for the purpose set forth.

2. A skate-roller having its tire A supported and strengthened by means of thin lateral disks B and B', inserted into annular recesses in the opposite inner sides of the tire, and forming with the same an oil-reservoir, a perforated sleeve, C, to receive the axle and connecting the disks, and an annular disk, D, between the lateral disks, provided with oil-guiding projections $r$ adjacent to the perforated portion of the sleeve, substantially as described.

HENRY B. COBB.

In presence of—
MASON BROSS,
WM. SADLER.